(12) United States Patent
Tsubaki et al.

(10) Patent No.: US 10,308,278 B2
(45) Date of Patent: Jun. 4, 2019

(54) ELECTRIC POWER STEERING APPARATUS

(71) Applicant: NSK LTD., Tokyo (JP)

(72) Inventors: Takahiro Tsubaki, Maebashi (JP); Tetsuya Kitazume, Maebashi (JP); Keita Yoshida, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/565,774

(22) PCT Filed: Mar. 17, 2017

(86) PCT No.: PCT/JP2017/010877
§ 371 (c)(1),
(2) Date: Oct. 11, 2017

(87) PCT Pub. No.: WO2017/164105
PCT Pub. Date: Sep. 28, 2017

(65) Prior Publication Data
US 2019/0084613 A1  Mar. 21, 2019

(30) Foreign Application Priority Data

Mar. 25, 2016  (JP) ................................ 2016-061816

(51) Int. Cl.
*B62D 6/00* (2006.01)
*B62D 5/04* (2006.01)
(Continued)

(52) U.S. Cl.
CPC .............. *B62D 5/0463* (2013.01); *B62D 6/00* (2013.01); *H02P 6/28* (2016.02)

(58) Field of Classification Search
CPC ... B62D 6/00; B62D 6/28; B62D 5/04; B62D 101/00; B62D 113/00; B62D 119/00; G06F 19/00
(Continued)

(56) References Cited

U.S. PATENT DOCUMENTS

2005/0071061 A1* 3/2005 Kato ....................... B60T 8/172
701/41
2008/0243339 A1* 10/2008 Nishimori .............. B60G 7/003
701/41
(Continued)

FOREIGN PATENT DOCUMENTS

JP  2002-120744 A   4/2002
JP  2004-352001 A  12/2004
(Continued)

OTHER PUBLICATIONS

International Search Report for PCT/JP2017/010877 dated May 30, 2017 {PCT/ISA/210].
(Continued)

*Primary Examiner* — Tan Q Nguyen
(74) *Attorney, Agent, or Firm* — Sughrue Mion, PLLC

(57) ABSTRACT

[Problem]
An object of the present invention is to provide an electric power steering apparatus that gradual-changes a steering angle control command value, an assist control command value and also a steering angle speed command value, suppresses an excessive accumulation of an integral value in a speed control by being provided a steering speed command value with a limiter, and does not give the driver an uncomfortable feeling.
[Means for solving the problem]
The present invention is the electric power steering apparatus that has a function to switch between an assist control mode and a steering angle control mode, wherein the steering angle control section comprises a position control section that inputs a target steering angle and an actual steering angle and outputs a first steering angle speed command value; a gradual-changing limiting section that limits an upper limiting value and a lower limiting value by gradual-changing a first steering angle speed command value cor-
(Continued)

responding to a steering angle control gradual-changing gain; a speed control section that processes a second steering angle speed command value, which is outputted from the gradual-changing limiting section, based on an actual steering angle speed and a steering angle control gradual-changing gain; and a first gradual-changing section that gradual-changes the first steering angle control command value, which is outputted from the speed control section, corresponding to a steering angle control gradual-changing gain and outputs a second steering angle control command value, further comprises a second gradual-changing section that gradual-changes a first assist control command value, which is outputted from an assist control section, with an assist control gradual-changing gain and outputs a second assist control command value, wherein a steering angle control section, and a motor current command value is generated based on the second steering angle control command value and the second assist control command value.

18 Claims, 10 Drawing Sheets

(51) Int. Cl.
*H02P 6/28* (2016.01)
*G06F 19/00* (2018.01)

(58) Field of Classification Search
USPC .......................................................... 701/44
See application file for complete search history.

(56) References Cited

U.S. PATENT DOCUMENTS

| | | | | |
|---|---|---|---|---|
| 2010/0114449 | A1* | 5/2010 | Shiozawa | B60L 3/10 |
| | | | | 701/90 |
| 2011/0118940 | A1* | 5/2011 | Kariatsumari | H02P 21/04 |
| | | | | 701/42 |
| 2015/0025745 | A1* | 1/2015 | Tamura | B62D 5/046 |
| | | | | 701/41 |
| 2015/0239495 | A1* | 8/2015 | Kameda | B62D 5/0466 |
| | | | | 701/41 |
| 2016/0288830 | A1* | 10/2016 | Hori | B62D 15/025 |

FOREIGN PATENT DOCUMENTS

| | | |
|---|---|---|
| JP | 3912279 B2 | 5/2007 |
| JP | 2010-058690 A | 3/2010 |
| WO | 2016/088705 A1 | 6/2016 |

OTHER PUBLICATIONS

Written Opinion for PCT/JP2017/010877 dated May 30, 2017 {PCT/ISA/237}.

* cited by examiner

PRIOR ART

STEERING ANGLE SPEED
COMMAND VALUE $\omega cb$

STEERING ANGLE CONTROL
GRADUAL-CHANGING GAIN SG

ASSIST CONTROL
GRADUAL-CHANGING GAIN AG

LIMITING VALUE OF LIMITER

STEERING ANGLE SPEED
COMMAND VALUE $\omega cb$

STEERING ANGLE CONTROL
GRADUAL-CHANGING GAIN SG

ASSIST CONTROL
GRADUAL-CHANGING GAIN AG

LIMITING VALUE OF LIMITER

ELECTRIC POWER STEERING APPARATUS

This application is a National Stage of International Application No. PCT/JP2017/010877 filed Mar. 17, 2017, claiming priority based on Japanese Patent Application No. 2016-061816 filed Mar. 25, 2016, the contents of all of which are incorporated herein by reference in their entirety.

TECHNICAL FIELD

The present invention relates to an electric power steering apparatus that has a switching function between an automatic steering control mode (a steering angle control mode of a parking assist or the like) and a manual steering control mode (an assist control mode) in a steering control of a vehicle, drives a motor by means of a motor current control value and applies an assist force to a steering system of the vehicle, and in particular to the electric power steering apparatus that gradual-changes a steering angle speed command value and a steering angle control command value in the steering angle control by means of a predetermined gradual-changing gain, gradual-changes an assist control command value by means of an assist control gradual-changing gain, suppresses an unintended handle variation to the motor current command value and reduces an uncomfortable feeling to a driver.

BACKGROUND ART

An electric power steering apparatus (EPS) which provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a steering angle sensor 14 for detecting a steering angle θr of the handle 1 and a torque sensor 10 for detecting a steering torque Th of the handle 1, and a motor 20 for assisting a steering force of the handle 1 is connected to the column shaft 2 through the reduction gears 3. The electric power is supplied to a control unit (ECU) 30 for controlling the electric power steering apparatus from a battery 13, and an ignition key signal IG is inputted into the control unit 30 through an ignition key 11. The control unit 30 calculates a current command value of an assist control on the basis of a steering torque Th detected by the torque sensor 10 and a vehicle speed Vs detected by a vehicle speed sensor 12, and controls a current supplied to the motor 20 by means of a voltage control command value Vref obtained by performing compensation or the like to the current command value. The steering angle θr is detected from the steering angle sensor 14. It is possible to obtain the steering angle from a rotational sensor which is connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processing Unit) and an MCU (Micro Controller Unit)), and general functions performed by programs within the CPU are, for example, shown in FIG. 2.

The control unit 30 will be described with reference to FIG. 2. The steering torque Th detected from the torque sensor 10 and the vehicle speed Vs detected from the vehicle speed sensor 12 (or from the CAN) are inputted into a current command value calculating section 31 which calculates a current command value Iref1. The current command value calculating section 31 calculates a current command value Iref1 which is a current control target value supplied to the motor 20, based on the inputted steering torque Th and the vehicle speed Vs using an assist map or the like. The current command value Iref1 is inputted into a current limiting section 33 via an adding section 32A. The current command value Iref3 whose maximum current is limited by an overheat protecting condition, is inputted into a subtracting section 32B. A deviation Iref4 (=Iref3−Im) which a fed-back motor current value Im is subtracted from the current command value Iref3 is calculated at the subtracting section 32B, and the deviation Iref4 is inputted into a proportional and integral (PI) control section 35 for improving characteristics in a steering operating. The voltage control command value Vref whose characteristics are improved at the PI-control section 35 is inputted into a pulse width modulation (PWM) control section 36. Further, the motor 20 is PWM-driven via an inverter 37 as a driving section. The motor current value Im is detected by a motor current detector 38 and is inputted into the subtracting section 32B for the feedback.

Further, the rotational sensor 21 such as a resolver is connected to the motor 20 and an actual steering angle θs is detected. A compensation signal CM from a compensating section 34 is added at the adding section 32A. A compensation of the system is performed by adding the compensation signal CM, and a convergence, an inertia characteristic and so on are improved. The compensating section 34 adds a self-aligning torque (SAT) 343 to an inertia 342 at an adding section 344. The adding result is further added with a convergence 341 at an adding section 345. The adding result at the adding section 345 is treated as the compensation signal CM.

In such an electric power steering apparatus, vehicles that have an automatic steering control mode (a steering angle control mode of a parking assist or the like) and a manual steering control mode (an assist control mode), and have a switching function between the automatic steering control mode and the manual steering control mode have emerged in recent years. In a case of realizing the automatic steering, generally, the vehicles have a steering angle control and an assist control independently, and have a configuration having a switching function between the outputs of the steering angle control and the assist control. In the steering angle control, a position speed control having an excellent performance in a response and an external disturbance suppression is used. The positional control is constituted by a proportional control (P-control), and the speed control is constituted by a proportional and integral control (PI-control) and so on.

The general electric power steering apparatus that comprises the functions of the steering angle control mode and the assist control mode, and has a function which the steering control mode is switched, will be described with reference to FIG. 3. A rotational sensor 151 such as a resolver for detecting a motor rotational angle θs is connected to the motor 150. The motor 150 is driving-controlled via a vehicle-side electronic control unit (ECU) 130 and an electric power steering (EPS)-side electronic control unit (ECU) 140. The vehicle-side ECU 130 comprises a switching command section 131 that outputs a switching command SW such as the steering angle control mode or the assist control mode, based on a button, a switch and so on which an intension of a driver is indicated, and a target steering angle generating section 132 that generates a target steering angle θt, based on signals such as a camera (an image) or a laser radar. The actual steering angle θr, which is detected by the steering angle sensor 14 provided with the column shaft (the steering shaft or the handle shaft), is inputted into a steering angle control section 200 in the EPS-side ECU 140 via the ECU 130.

The switching command section 131 outputs the switching command SW, based on a signal which identifies a switching to the steering angle control mode, for example, by using the button or the switch which is provided with a dashboard or the vicinity of the handle and indicate the intension of the driver, or a vehicle status signal which indicates a parking mode or the like by using a shift lever. The switching command SW is inputted into a switching section 142 in the EPS-side ECU 140. The target steering angle generating section 132 generates the target steering angle θt by using a known method, based on data such as the camera (the image) or the laser radar, and inputs the target steering angle θt into the steering angle control section 200 in the EPS-side ECU 140.

The EPS-side ECU 140 comprises an assist control section 141 that outputs an assist control command value Itref calculated based on the steering torque Th and the vehicle speed Vs, a steering angle control section 200 that calculates and outputs a steering angle control command value Imref for the steering angle control based on the target steering angle θt, the actual steering angle θr and a motor angle speed ωr, a switching section 142 that switches between the assist control command value Itref and the steering angle control command value Imref by means of the switching command SW, a current control/driving section 143 that driving-controls the motor 150 based on a motor current command value Iref (=Itref or Imref) from the switching section 142 and a motor angle speed calculating section 144 that obtains the motor speed based on the motor rotational angle θs from the rotational sensor 151 and calculates the actual angle speed ωr by using the motor speed and the gear ratio. The motor angle speed calculating section 144 comprises a low pass filter (LPF) that is disposed at a rear stage of a calculation corresponding to differential and reduces a high frequency noise.

As shown in FIG. 4, the steering angle control section 200 comprises a position control section 210 that outputs a steering angle speed command value ωc so that the actual steering angle θr follows the target steering angle θt, and a speed control section 220 that outputs a steering angle control command value Imref so that the actual steering angle speed ωr follows the steering angle speed command value ωc. The switching section 142 switches between the assist control mode (manual steering control) by the assist control section 141 and the steering angle control mode (position/speed control mode) by the steering angle control section 200, outputs the assist control command value Itref in the assist control mode and outputs the steering angle control command value Imref in the steering angle control mode.

As well, the actual angle speed and the motor angle speed have a relationship with a ratio of the reduction mechanism.

In the electric power steering apparatus having such a function, immediately switching the mode by using the switch or the like when the steering mode is switched, the driver feels uncomfortable because the motor current command value Iref is sharply changed and a handle becomes an unnatural behavior.

THE LIST OF PRIOR ART DOCUMENTS

Patent Documents

Patent Document 1: Japanese Patent No. 3912279 B2

SUMMARY OF THE INVENTION

Problems to be Solved by the Invention

Thus, a method that the sharply changing of the motor current command value is suppressed by multiplying the steering angle control command value and the assist control command value with a gradual-changing gain, and gradually switching the steering mode, is used. However, since the steering angle control command value, which is limited by the gradual-changing gain when switching, is outputted to the motor current command value in this method, the output decreases by the limited value of the current command value to the steering angle command value. Since the actual steering angle speed of the motor becomes slower to the steering angle speed command value due to this limiting, the deviation between the steering angle speed command value and the actual steering angle speed is occurred, an integral value of the I-control in the speed control is accumulated, and further larger steering angle control command value is outputted from the speed control. As a result, in a state that gradual-changing gain gradually increases, since the limiting of the gradual-changing gain is moderated, the steering angle control command value is an excessive value when the gradual-changing gain becomes larger, the handle is excessively responded to the steering angle speed command value, and the driver feels uncomfortable.

For example, in Japanese Patent No. 3912279 B2 (Patent Document 1), the method that the steering angle speed is controlled to gradually increase when beginning the steering angle control, and the uncomfortable feeling to the driver due to the sharply changing of the handle when beginning the steering angle control is reduced, is proposed. However, in the method of Patent Document 1, since the steering angle speed arrives at an upper limiting value when the gradual-changing is begun, there is a problem that the integral value of the I-control is excessively accumulated.

The present invention has been developed in view of the above-described circumstances, and an object of the present invention is to provide the electric power steering apparatus that gradual-changes the steering angle control command value, the assist control command value, and also the steering angle speed command value, suppresses the excessive accumulation of the integral value in the speed control by being provided the steering speed command value with a limiter, and does not give the driver an uncomfortable feeling.

Means for Solving the Problems

The present invention relates to an electric power steering apparatus that has a function to switch between an assist control mode and a steering angle control mode, generates a motor current command value by means of a first assist control command value calculated at an assist control section and a first steering angle control command value calculated at a steering angle control section, and assist-controls a steering system of a vehicle by driving a motor by means of the motor current command value, the above-described object of the present invention is achieved by that: wherein the steering angle control section comprises a position control section that inputs a target steering angle and an actual steering angle and outputs a first steering angle speed command value; a gradual-changing limiting section that limits an upper limiting value and a lower limiting value with gradual-changing the first steering angle speed command value corresponding to a steering angle control gradual-changing gain; a speed control section that processes a second steering angle speed command value, which is outputted from the gradual-changing limiting section, based on an actual steering angle speed and a steering angle control gradual-changing gain; and a first gradual-changing section that gradual-changes the first steering angle control command value, which is outputted from the speed control section, corresponding to the steering angle control gradual-changing gain and outputs a second steering angle control command value, wherein the electric power steering apparatus further comprises second gradual-changing section that gradual-changes the first assist control command value, which is outputted from the assist control section, with an assist control gradual-changing gain and outputs a second assist control command value, and the motor current command value is generated based on the second steering angle control command value and the second assist control command value.

The above-described object of the present invention is efficiently achieved by that wherein a sum of a rate of the steering angle control gradual-changing gain and a rate of the assist control gradual-changing gain is 1.0 or 100% when the assist control mode and the steering angle control mode are switched, and the rate of the steering angle control gradual-changing gain inversely increases or decreases when the rate of the assist control gradual-changing gain decreases or increases; or wherein the gradual-changing limiting section comprises a third gradual-changing section that gradual-changes the first steering angle speed command value corresponding to the steering angle control gradual-changing gain, and a limiter that limits an upper limiting value and a lower limiting value of a steering angle speed command value after gradual-changing which is gradual-changed at the third gradual-changing section and outputs a second steering angle speed command value; or wherein the upper limiting value and the lower limiting value of the limiter are variably set corresponding to the steering angle control gradual-changing gain; or wherein the position control section comprises a first subtracting section that calculates a position deviation between the target steering angle and the actual steering angle, and a gain section that outputs the steering angle speed command value by gain-multiplying the position deviation; or wherein the speed control section comprises a second subtracting section that subtracts the actual steering angle speed from the second steering angle speed command value, an integral section that integral-processes a subtracting result of the second subtracting section, a proportional section that proportional-processes the actual steering angle speed, a third subtracting section that subtracts a proportional result of the proportional section from an integral result of the integral section, and a fourth gradual-changing section that gradual-changes a subtracting result of the third subtracting section with the steering angle control gradual-changing gain and outputs the first steering angle control command value; or wherein the speed control section comprises a second subtracting section that subtracts the actual steering angle speed from the second steering angle control command value, a multiplying section that gradual-changes a speed deviation from the second subtracting section with the steering angle control gradual-changing gain and outputs a speed deviation, an integral section that integral-processes the speed deviation, a proportional section that proportional-processes the actual steering angle speed, and a subtracting section that subtracts a proportional result of the proportional section from an integral result of the integral section and outputs the first steering angle control command value; or wherein the speed control section comprises a second subtracting section that subtracts the actual steering angle speed from the second steering angle speed command value, an integral section that integral-processes a speed deviation from the second subtracting section, a proportional section that proportional-processes the actual steering angle speed, a fourth gradual-changing section that gradual-changes an integral result of the integral section by the steering angle control gradual-changing gain and outputs a third steering angle control command value, and a third subtracting section that subtracts a proportional result of the proportional section from the third steering angle control command value and outputs the first steering angle control command value; or wherein the speed control section comprises a second subtracting section that subtracts the actual steering angle speed from the second steering angle speed command value, an integral section that integral-processes a speed deviation from the second subtracting section, a fourth gradual-changing section that gradual-changes the actual steering angle speed with the steering angle control gradual-changing gain, and outputs a steering angle control command value after gradual-changing, a proportional section that proportional-processes the steering angle control command value after gradual-changing, and a third subtracting section that subtracts a proportional result of the proportional section from an integral result of the integral section and outputs the first steering angle control command value.

Effects of the Invention

According to the electric power steering apparatus of the present invention, since the steering angle speed command value and the steering angle control command value in the steering angle control are gradual-changed with the steering angle control gradual-changing gain or the independent gradual-changing gain, and the upper limiting value and the lower limiting value in the speed control are limited until the gradual-changing is almost completed, the integral value of the integral control in the speed control is not excessively accumulated, the unintended variation of the handle is suppressed to the motor current command value, and the uncomfortable feeling to the driver can be reduced.

MODE FOR CARRYING OUT THE INVENTION

Figure 1:
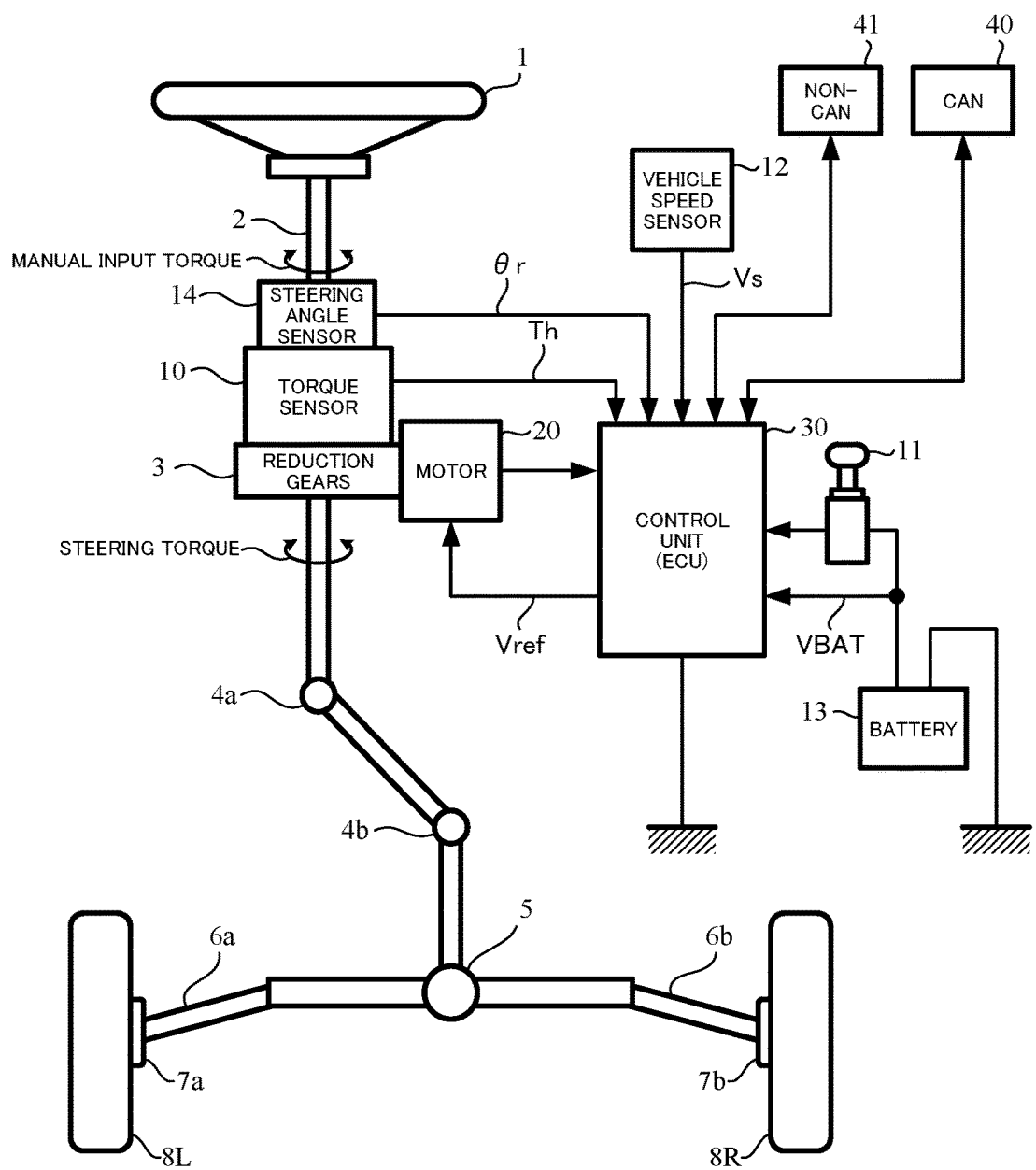
FIG. 1 is a configuration diagram illustrating a general outline of an electric power steering apparatus.
Figure 2:
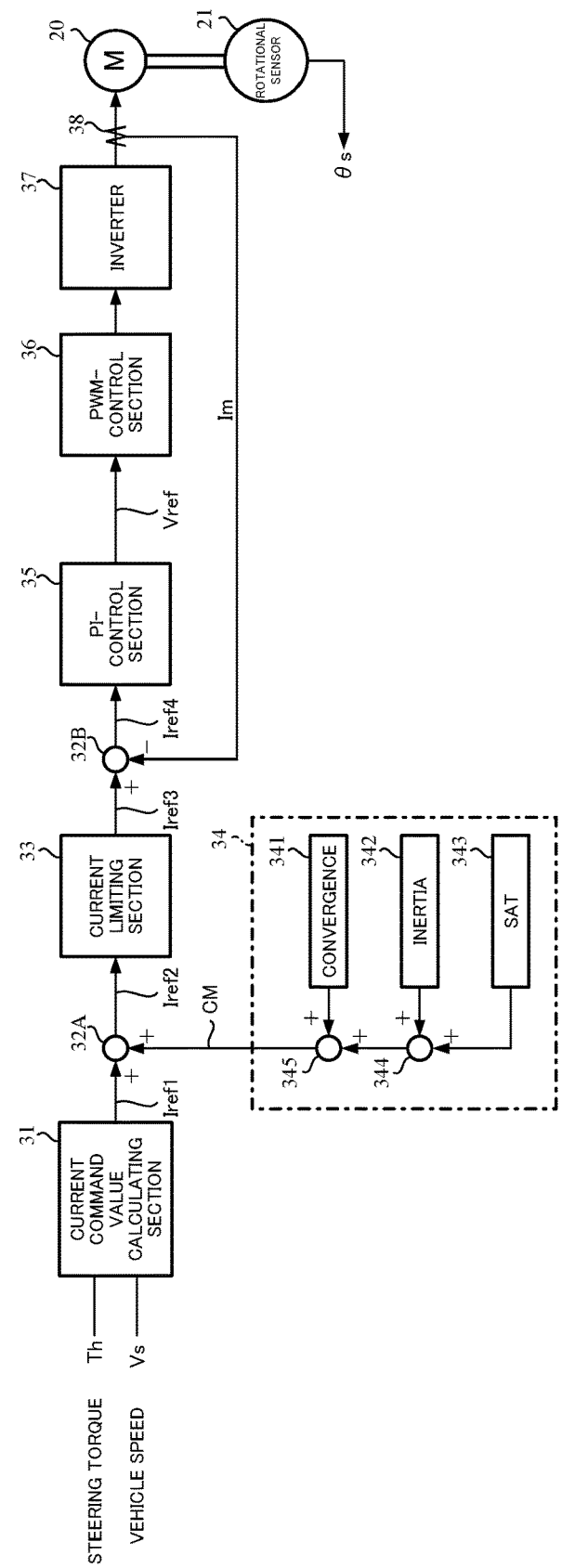
FIG. 2 is a block diagram showing a general configuration example of a control system of the electric power steering apparatus.
Figure 3:
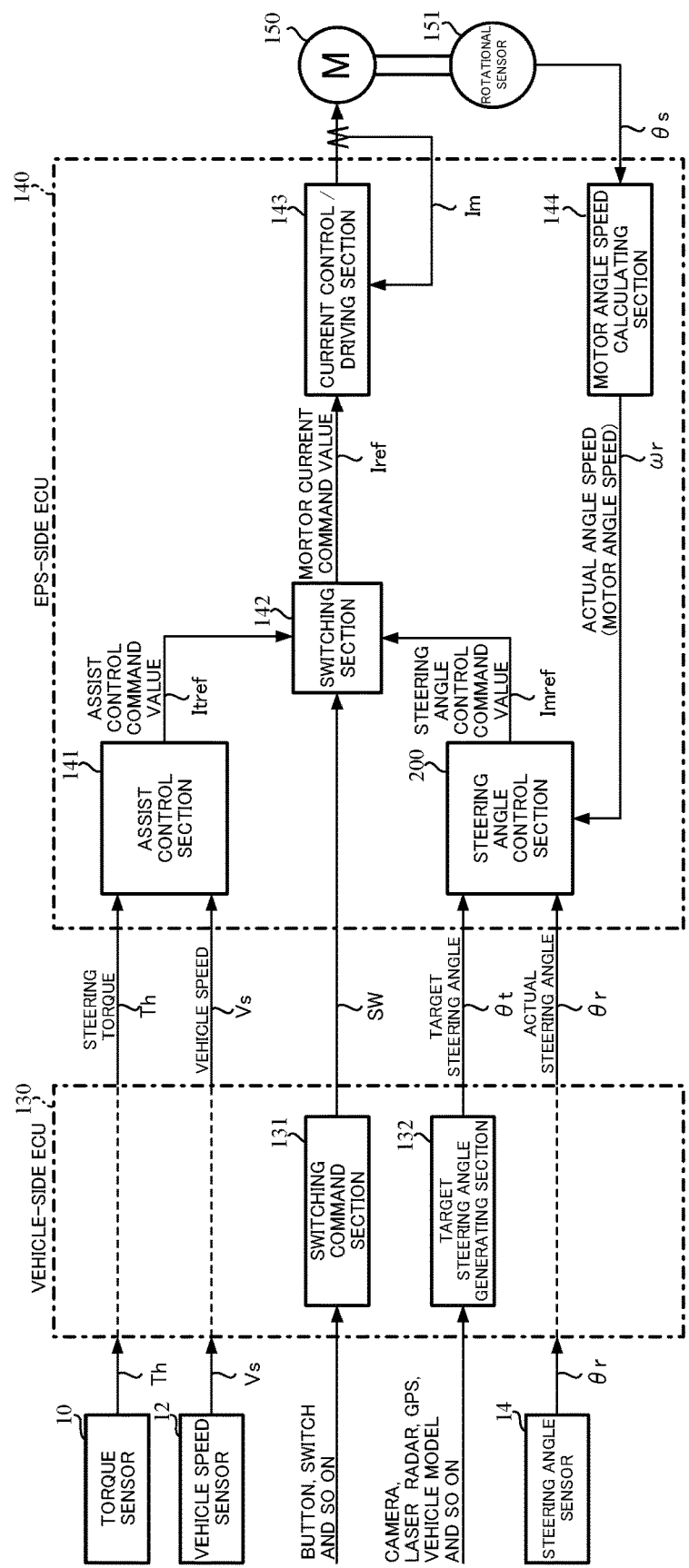
FIG. 3 is a block diagram showing an example of the electric power steering apparatus having a switching function between an automatic steering control mode and a manual steering control mode.
Figure 4:
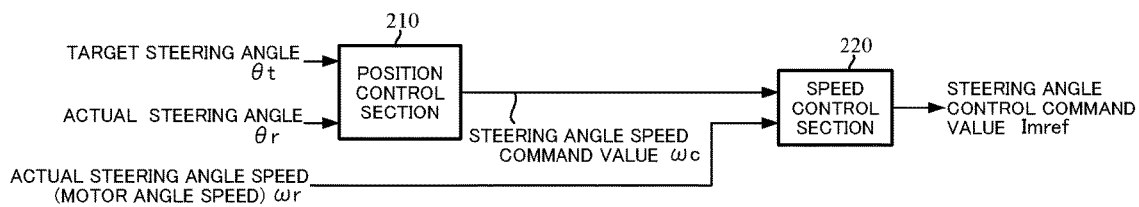
FIG. 4 is a block diagram showing a configuration example of a steering angle control section.

An electric power steering apparatus of the present invention gradual-changes a steering angle speed command value from a position control section in a steering angle control section with a steering angle control gradual-changing gain, limits an upper limiting value and a lower limiting value of the steering angle speed command value after gradual-changing by a limiter, and inputs the steering angle speed command value into a speed control section. A steering angle control command value is gradual-changed with the steering angle control gradual-changing gain. An assist control command value from an assist control section is gradual-changed by being multiplied with an assist control gradual-changing gain. The gains have a characteristic that the steering angle control gradual-changing gain increases or decreases when the assist control gradual-changing gain decreases or increases. When switching a control mode, a sum of a rate of the steering angle control gradual-changing gain and a rate of the assist control gradual-changing gain is 1.0 or 100% (when the rate of the steering angle control gradual-changing gain changes 0.0 (0%) to 1.0 (1000), the rate of the assist control gradual-changing gain changes 1.0 (100%) to 0.0 (0%)). The gains have a characteristic that the steering angle control gradual-changing gain inversely increases or decreases when the assist control gradual-changing gain decreases or increases (linear or non-linear).

When beginning the steering angle control, the steering angle speed command value is gradual-changed with the steering angle control gradual-changing gain. The steering angle speed command value after gradual-changing is limited by the limiter that an upper value and a lower value are successively changeable. The upper limiting value and the lower limiting value become smaller when the steering angle control gradual-changing gain is less than a threshold, and the upper limiting value and the lower limiting value become larger when the steering angle control gradual-changing gain is more than or equal to the threshold. The steering angle speed command value is limited in the above manner. An excessive accumulation of an integral value in the speed control section can be suppressed by changing the limiting value of the limiter of the steering angle control gradual-changing gain and the steering angle speed command value. Further, the steering angle control command value after gradual-changing in the speed control section is gradual-changed by multiplying with the steering angle control gradual-changing gain. Consequently, an uncomfortable feeling to a driver is reduced.

After gradual-changing is completed, since the steering angle speed command value is not limited by the limiting value of the steering angle control gradual-changing gain and the limiting value during gradual-changing, a control can be shifted to a normal steering angle control.

Embodiments according to the present invention will be described with reference to the drawings in detail.

Figure 5:
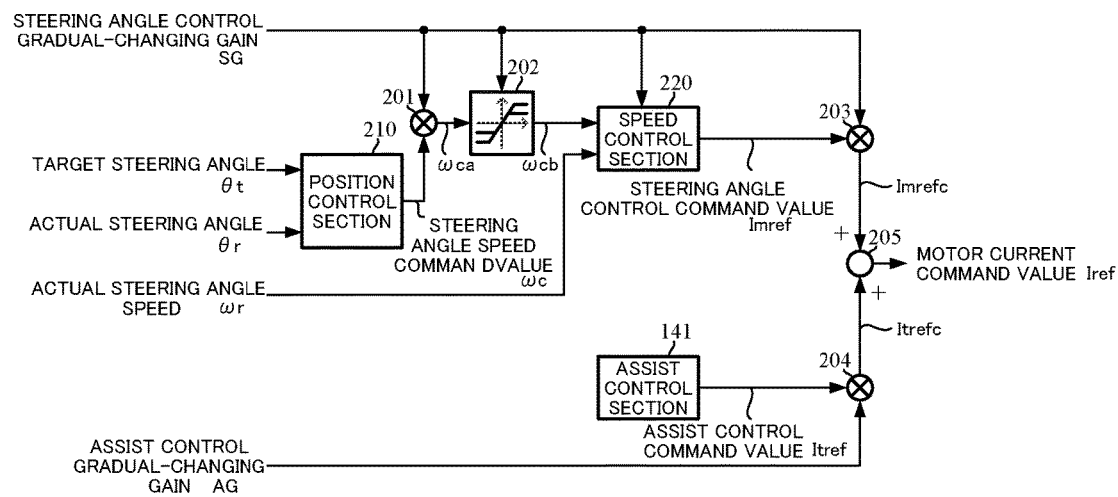
FIG. 5 is a block configuration diagram showing an embodiment of the present invention.

FIG. 5 shows a configuration example of the present invention. A target steering angle θt and an actual steering angle θr are inputted into a position control section 210 for following a position, and the steering angle speed command value ωc from the position control section 210 is inputted into a multiplying section 201 comprising a gradual-changing section. A steering angle control gradual-changing gain SG is inputted into the multiplying section 201, and the steering angle speed command value coca which is gradual-changed at the multiplying section 201 is inputted into the limiter 202 which limits the upper limiting value and the lower limiting value. The steering angle control gradual-changing gain SG is inputted into the limiter 202, and the limiting values are variably set corresponding to the steering angle control gradual-changing gain SG. The steering angle speed command value ωcb, which is limited the upper limiting value and the lower limiting value by the limiter 202, and an actual steering angle speed ωr are inputted into the speed control section 220 which performs a speed follow-up. The steering angle control command value Imref from the speed control section 220 is inputted into a multiplying section 203 comprising the gradual-changing section, and the gradual-changed steering angle control command value Imrefc is inputted into an adding section 205. As described above, these are a configuration of the steering angle control section. A gradual-changing limiting section comprises the multiplying section 201 and the limiter 202.

On the other hand, the assist control command value Itref from the assist control section 141 is inputted into a multiplying section 204, and is gradual-changed with the assist control gradual-changing gain AG. The gradual-changed assist control command value Itrefc is inputted into an adding section 205 and is added to a steering angle control command value Imrefc, and a motor current command value Iref is generated.

The steering angle control gradual-changing gain SG and the assist control gradual-changing gain AG have a switching characteristic between the steering angle control mode (the steering angle control gradual-changing gain SG=100% and the assist control gradual-changing gain AG=0%) and the assist control mode (the steering angle control gradual-changing gain SG=0% and the assist control gradual-changing gain AG=100%) by gradual-changing. The steering angle control gradual-changing gain inversely increases or decreases when the assist control gradual-changing gain decreases or increases.

Figure 6:
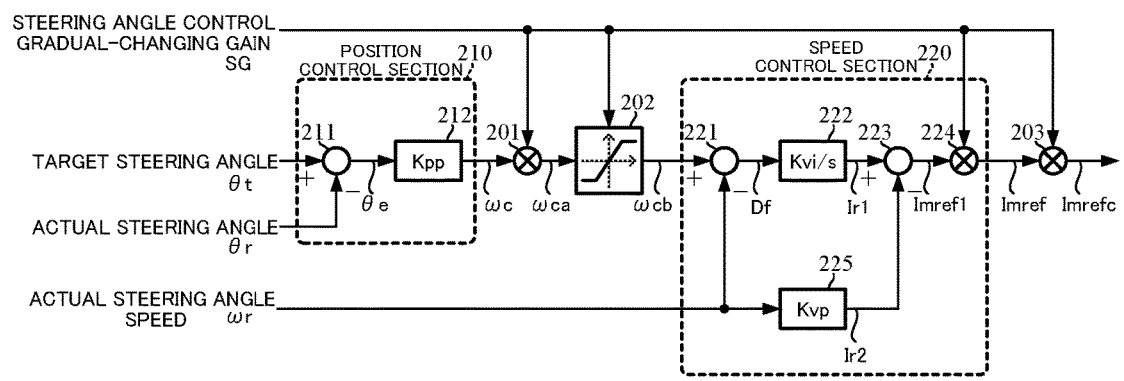
FIG. 6 is a block diagram showing a configuration example (a first example) of the steering angle control section.

FIG. 6 shows the first example of a steering angle control section 200. The position control section 210 comprises a subtracting section 211 that calculates a position deviation θe between the target steering angle θt and the actual steering angle θr, and a gain section 212 that outputs the steering angle speed command value ωc whose value is calculated by multiplying the position deviation θe with the gain (Kpp). The steering angle speed command value ωc is inputted into the multiplying section 201, and is gradual-changed with the steering angle control gradual-changing gain SG at the multiplying section 201. The gradual-changed steering angle speed command value ωca is inputted into the limiter 202 which limits the upper limiting value and the lower limiting value. The limiter 202 has a limiting value 1 and a limiting value 2 (the limiting value 2>the limiting value 1) which are limited in positive and negative regions. The gradual-changing limiting section comprises the multiplying section 201 and the limiter 202.

The steering angle speed command value ωcb, which is limited by the upper limiting value and the lower limiting value at the limiter 202 of the gradual-changing limiting section, is inputted into the speed control section 220. The speed control section 220 comprises a subtracting section 221 that subtracts the actual steering angle speed ωr from the steering angle speed command value ωcb; an integral section 222 that integral-processes (Kvi/s) and compensates a speed deviation Df which is a subtracting result of the subtracting section 221; a proportional section 225 that proportional-processes (Kvp) and compensates the actual steering angle speed ωr; a subtracting section 223 that subtracts the steering angle control command value Ir2 which is a proportional result of the proportional section 225 from the steering angle control command value Ir1 which is an integral result of the integral section 222; and a multiplying section 224 that gradual-changes the steering angle control command value Imref1, which is a subtracting result of the subtracting section 223, with the steering angle control gradual-changing gain SG, and outputs the steering angle control command value Imref.

Figure 7:
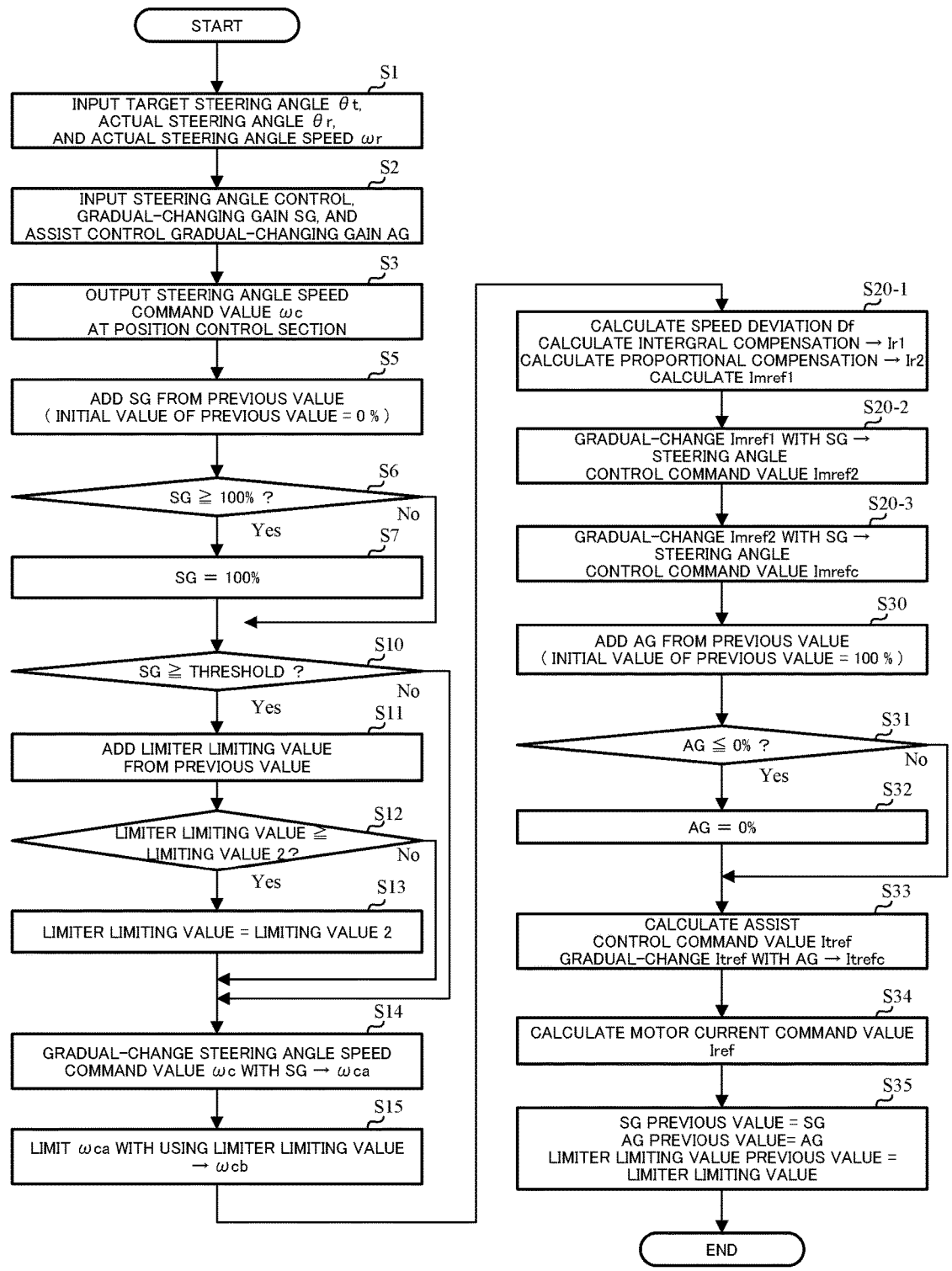
FIG. 7 is a flowchart showing an operation example of the present invention.

In such a configuration, an operation example will be described with reference to a flowchart of FIG. 7.

At first, the target steering angle θt, the actual steering angle θr and the actual steering angle speed ωr are inputted (Step S1), and then the steering angle control gradual-changing gain SG and the assist control gradual-changing gain AG are inputted (Step S2). These input orders may appropriately be changed.

The position control section 210 position-controls so that the actual steering angle θr follows the target steering angle θt. That is, the position deviation θe between the target steering angle θt and the actual steering angle θr is calculated at the subtracting section 211, and the position deviation θe is gain (Kpp)-multiplied at the gain section 212 and then is inputted into the limiter 202. The steering angle speed command value ωc, which is limited with the upper limiting value and the lower limiting value at the limiter 202, is outputted (Step S3). The steering angle speed command value ωc is inputted into the multiplying section 201. The steering angle speed command value ωca which is gradual-changed at the multiplying section 201 is inputted into the limiter 202, and is limited with the upper limiting value and the lower limiting value at the limiter 202 as follows.

The steering angle control gradual-changing gain SG is inputted into the limiter 202 and is added (an initial previous value of SG=0%) (as shown in FIG. 8 and FIG. 9 which are described below, in a case that the steering angle control gradual-changing gain SG is linearly varied in time series, an adding value may be a constant value) from a previous value of the steering angle control gradual-changing gain SG (Step S5), and the steering angle control gradual-changing gain SG is processed so as to become 100% (Steps S6 and S7). When the steering angle control gradual-changing gain SG becomes 100%, it is judged whether the steering angle control gradual-changing gain SG is more than or equal to a threshold or not (Step S10). In a case that the steering angle control gradual-changing gain SG is more than or equal to the threshold, the limiter limiting value is added from a previous value (Step S11) (as shown in FIG. 8 and FIG. 9 which are described below, in a case that the steering angle control gradual-changing gain SG is linearly varied in time series, an adding value may be a constant value), and then it is judged whether the limiter limiting value is more than or equal to a limiting value 2 or not (Step S12). In a case that the limiter limiting value is more than or equal to the limiting value 2, the limiter limiting value is set to the limiting value 2 (Step S13).

Thereafter, or in a case that the steering angle control gradual-changing gain SG is less than the threshold at the above Step S10, or in a case that the limiter limiting value is less than the limiting value 2 at the above Step S12, the steering angle speed command value ωc which is outputted from the position control section 210, is gradual-changed with the steering angle control gradual-changing gain SG at the multiplying section 201 (Step S14). The steering angle speed command value after gradual-changing ωca from the multiplying section 201 is inputted into the limiter 202 and is limited the upper limiting value and the lower limiting value (Step S15). The steering angle speed command value ωcb, which is limited the upper limiting value and the lower limiting value, and the actual steering angle speed ωr are inputted into the speed control section 220, and the speed control which the actual steering angle speed ωr follows the steering angle speed command value ωcb is performed.

In the speed control section 220, a speed deviation Df between the steering angle speed command value ωcb and the actual steering angle speed ωr is calculated at a subtracting section 221 (Step S20-1), the speed deviation Df is integrated at an integral section 222, and the calculated steering angle control command value Ir1 is inputted into a subtracting section 223 (Step S20-1). The actual steering angle speed ωr is proportional-processed (Kvp) at a proportional section 225, the processed steering angle control command value Ir2 is inputted into the subtracting section 223, and the steering angle control command value Imref1 which is a deviation is calculated at the subtracting section 223 (Step S20-1). The steering angle control command value Imref1 is gradual-changed with the steering angle control gradual-changing gain SG at a multiplying section 224 (Step S20-2), the gradual-changed steering angle control command value Imref1 in the speed control section 220 is further gradual-changed with the steering angle control gradual-changing gain SG at the multiplying section 203, and the gradual-changed steering angle control command value Imrefc is outputted (Step S20-3).

The assist control gradual-changing gain AG is inputted into the steering angle control unit 200 and is subtracted (an initial previous value of AG=100%) from a previous value of the assist control gradual-changing gain AG (Step S30), and the assist control gradual-changing gain AG is processed so that the assist control gradual-changing gain AG becomes 0% or less (Step S31 and S32). When the assist control gradual-changing gain AG becomes 0%, the assist control command value Itref is calculated and is gradual-changed with the assist control gradual-changing gain AG at the multiplying section 204, and the assist control command value Itrefc is outputted (Step S33).

After that, the gradual-changed assist control command value Itrefc is inputted into the adding section 205 and is added to the steering angle control command value Imrefc, and the motor current command value Iref is calculated (Step S34). The motor is driven by the motor current command value Iref. The previous value of the steering angle control gradual-changing gain SG is updated to the steering angle control gradual-changing gain SG, the previous value of the assist control gradual-changing gain AG is updated to the assist control gradual-changing gain AG and the previous value of the limiter limiting value is updated to the limiter limiting value (Step S35).

FIG. 8 and FIG. 9 are time charts that show relationships among the steering angle speed command value after processing at the limiter ωcb, the steering angle control gradual-changing gain SG, the assist control gradual-changing gain AG and the limiting value of the limiter 202. In an example of FIG. 8, the control mode is started to switch from the assist control to the steering angle control at a time point t0, and is completely switched to the steering angle control at a time point t3. The limiting value of the limiter 202 is gradually varied from the limiting value 1 to the limiting value 2 (>the limiting value 1) between a time point t2 (set by the threshold) that is prior to the time point t3 which the control mode is completely switched to the steering angle control, and a time point t4 that is posterior to the time point t3. In an example of FIG. 9, the control mode is also started to switch from the assist control to the steering angle control at a time point t10, and is completely switched to the steering angle control at a time point t12. For this example, the limiting value of the limiter 202 is varied from the limiting value 1 to the limiting value 2 between a time point t12, which the control mode is completely switched to the steering angle control, and a time point t13 which is posterior to the time point t12.

Figure 8A:
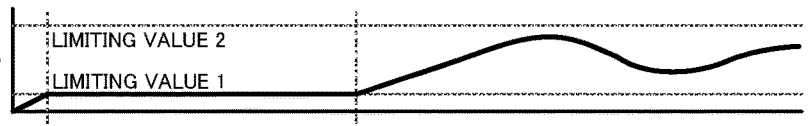
FIG. 8A to FIG. 8D are time charts showing an operation example (the first embodiment) of the present invention.
Figure 8B:
Figure 8C:
Figure 8D:
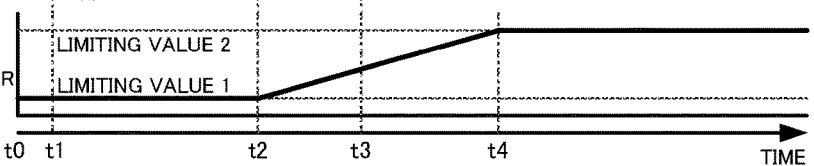
Figure 9A:
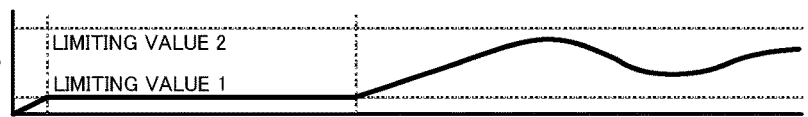
FIG. 9A to FIG. 9D are time charts showing an operation example (the second embodiment) of the present invention.
Figure 9B:
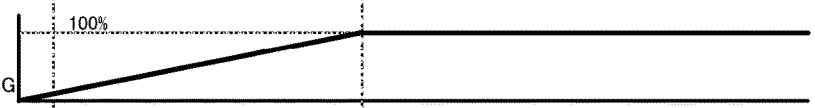
Figure 9C:
Figure 9D:
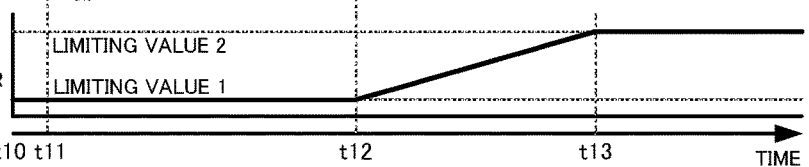

As shown in FIG. 8B and FIG. 8C from the time point t0 to the time point t3 and as shown in FIG. 9B and FIG. 9C from the time point t10 to the time point t12, the sum of the rate of the steering angle control gradual-changing gain SG and the rate of the assist control gradual-changing gain AG is 1.0 or 100%. The steering angle control gradual-changing gain SG inversely increases or decreases when the assist control gradual-changing gain AG decreases or increases. The waveform (characteristic) of the increasing and the decreasing is any shape, and may be linear or non-linear.

Figure 10:
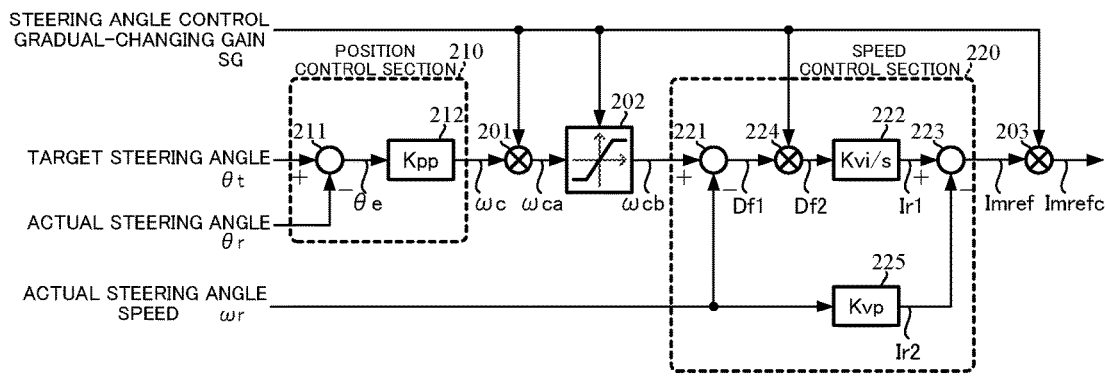
FIG. 10 is a block diagram showing a configuration example (the second example) of the steering angle control section.

FIG. 10 shows the second example of the steering angle control section 200. The configurations except for the speed control section 220 are the same as those of the steering angle control section 200 of the first example as shown in FIG. 6. The speed control section 220 comprises a subtracting section 221 that subtracts the actual steering angle speed ωr from the steering angle speed command value ωcb; a multiplying section 224 that gradual-changes a speed deviation Df1, which is a subtracting result of the subtracting section 221, with the steering angle control gradual-changing gain SG, and outputs a speed deviation Df2; an integral section 222 that integral-processes (Kvi/s) and compensates the speed deviation Df2; a proportional section 225 that proportional-processes (Kvp) and compensates the actual steering angle speed ωr; and a subtracting section 223 that subtracts the steering angle control command value Ir2, which is a proportional result of the proportional section 225, from the steering angle control command value Ir1, which is an integral result of the integral section 222, and outputs the steering angle control command value Imref.

Figure 11:
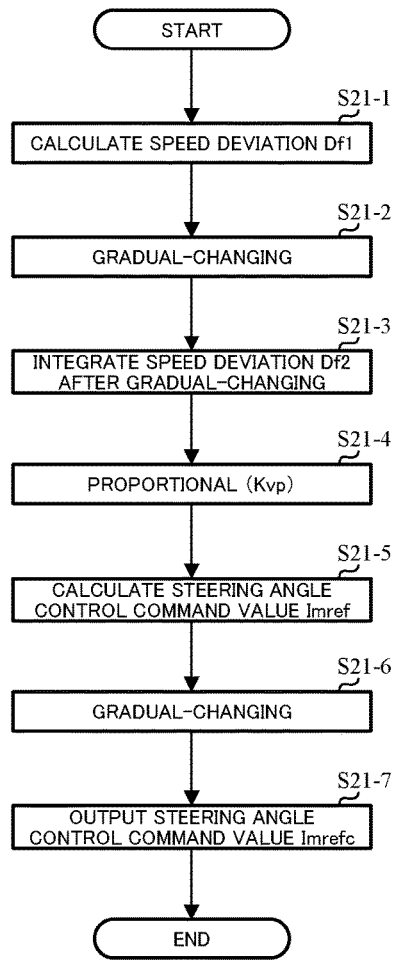
FIG. 11 is a flowchart showing an operation example (the second example) of the steering angle control section.

In such a configuration, an operation example will be described with reference to a flowchart of FIG. 11. In this case, the operation of the steering angle control section 200 is only different from that of the speed control section 220 in FIG. 6, and is the same as the flowchart of FIG. 7 except for Steps S20-1 to S20-3 corresponding to the speed control.

At first, the speed deviation Df1 is calculated at the subtracting section 221 (Step S21-1), and the speed deviation Df1 is gradual-changed with the steering angle control gradual-changing gain SG at the multiplying section 224 (Step S21-2). The gradual-changed speed deviation Df2 is inputted into the integral section 222 and is integrated. The steering angle control command value Ir1 which is the integral value is inputted into the subtracting section 223 (Step S21-3). The actual steering angle speed ωr is proportional-processed (Kvp) at the proportional section 225, and the steering angle control command value Ir2 from the proportional section 223 is inputted into the subtracting section 223 (Step S21-4). The subtracting section 223 subtracts the steering angle control command value Ir2 from the steering angle control command value Ir1, and calculates and outputs the steering angle control command value Imref (Step S21-5). Then, the steering angle control command value Imref is gradual-changed with the steering angle control gradual-changing gain SG at the multiplying section 203 (Step S21-6), and the gradual-changed steering angle control command value Imrefc is outputted (Step S21-7).

Figure 12:
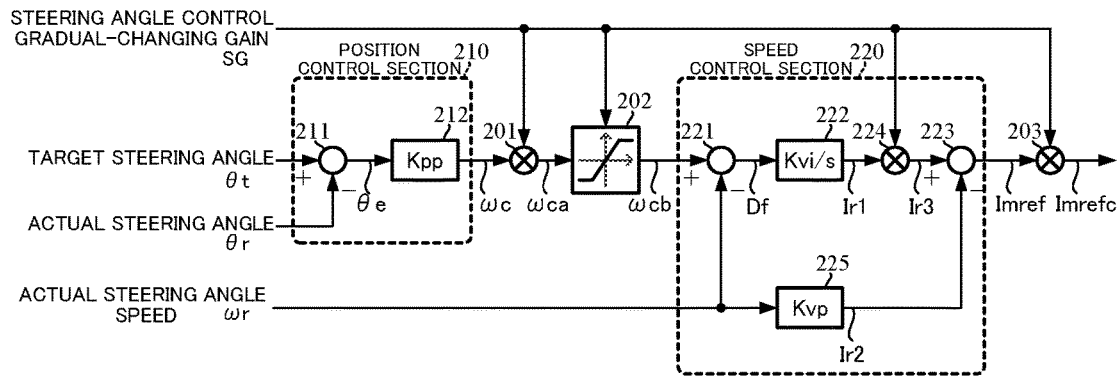
FIG. 12 is a block diagram showing a configuration example (the third example) of the steering angle control section.

FIG. 12 shows the third example of the steering angle control section 200. The configurations except for the speed control section 220 are the same as those of the steering angle control section 200 of the first example as shown in FIG. 6. The speed control section 220 comprises a subtracting section 221 that subtracts the actual steering angle speed ωr from the steering angle speed command value ωcb; an integral section 222 that integral-processes (Kvi/s) and compensates a speed deviation Df which is a subtracting result of the subtracting section 221; a proportional section 225 that proportional-processes (Kvp) and compensates the actual steering angle speed ωr; a multiplying section 224 that gradual-changes the steering angle control command value Ir1, which is an integral result of the integral section 222, with the steering angle control gradual-changing gain SG, and outputs the steering angle control command value Ir3; and a subtracting section 223 that subtracts the steering angle control command value Ir2, which is a proportional result of the proportional section 225, from the steering angle control command value Ir3, and outputs the steering angle control command value Imref.

Figure 13:
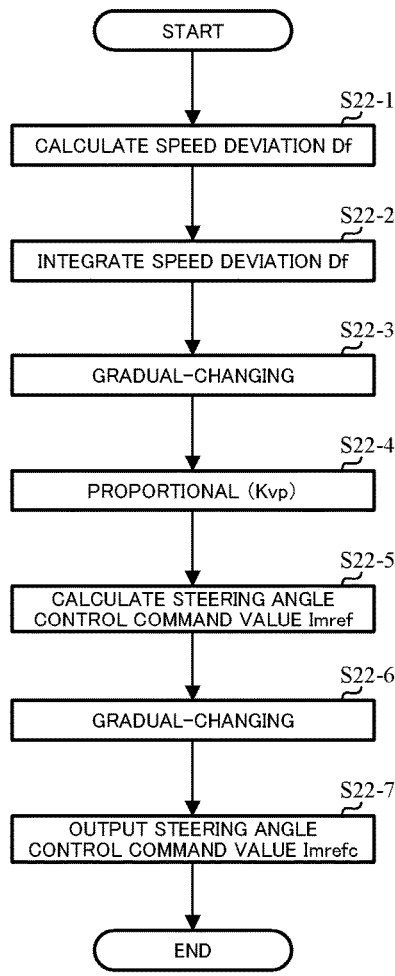
FIG. 13 is a flowchart showing an operation example (the third example) of the steering angle control section.

In such a configuration, an operation example will be described with reference to a flowchart of FIG. 13. In this case, the operation of the steering angle control section 200 is only different from that of the speed control section 220 in FIG. 6, and is the same as the flowchart of FIG. 7 except for Steps S20-1 to S20-3 corresponding to the speed control.

At first, the speed deviation Df is calculated at the subtracting section 221 (Step S22-1), and the speed deviation Df is inputted into the integral section and is integrated (Step S22-2). The steering angle control command value Ir1 which is an integral value is inputted into the multiplying section 224 and is gradual-changed by the steering angle control gradual-changing gain SG at the multiplying section 224, and the gradual-changed steering angle control command value Ir3 is inputted into the subtracting section 223 (Step S22-3). The actual steering angle speed ωr is proportional-processed (Kvp) at the proportional section 225, and the steering angle control command value Ir2 from the proportional section 225 is inputted into the subtracting section 223 (Step S22-4). The subtracting section 223 subtracts the steering angle control command value Ir2 from the steering angle control command value Ir3, and calculates and outputs the steering angle control command value Imref (Step S22-5). Then, the steering angle control command value Imref is gradual-changed with the steering angle control gradual-changing gain SG at the multiplying section 203 (Step S22-6), and the gradual-changed steering angle control command value Imrefc is outputted (Step S22-7).

Figure 14:
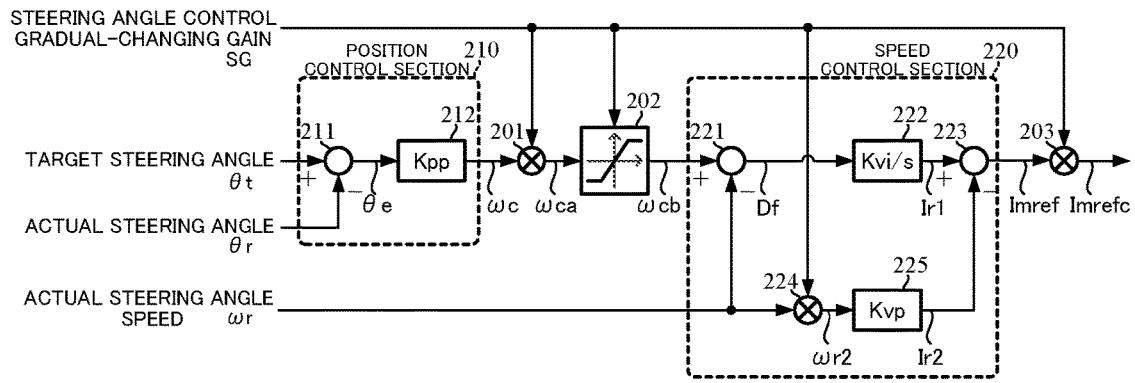
FIG. 14 is a block diagram showing a configuration example (the fourth example) of the steering angle control section.

FIG. 14 shows the fourth example of the steering angle control section 200, and the configurations except for the speed control section 220 are the same as those of the steering angle control section 200 of the first example as shown in FIG. 6. The speed control section 220 comprises a subtracting section 221 that subtracts the actual steering angle speed ωr from the steering angle speed command value ωcb; an integral section 222 that integral-processes (Kvi/s) and compensates a speed deviation Df which is a subtracting result of the subtracting section 221; a multiplying section 224 that gradual-changes the actual steering angle speed ωr with the steering angle control gradual-changing gain SG, and outputs a steering angle speed after gradual-changing ωr2; a proportional section 225 that proportional-processes (Kvp) and compensates the steering angle speed after gradual-changing ωr2; and a subtracting section 223 that subtracts the steering angle control command value Ir2, which is a proportional result of the proportional section 225, from the steering angle control command value Ir1, which is an integral result of the integral section 222, and outputs the steering angle control command value Imref.

Figure 15:
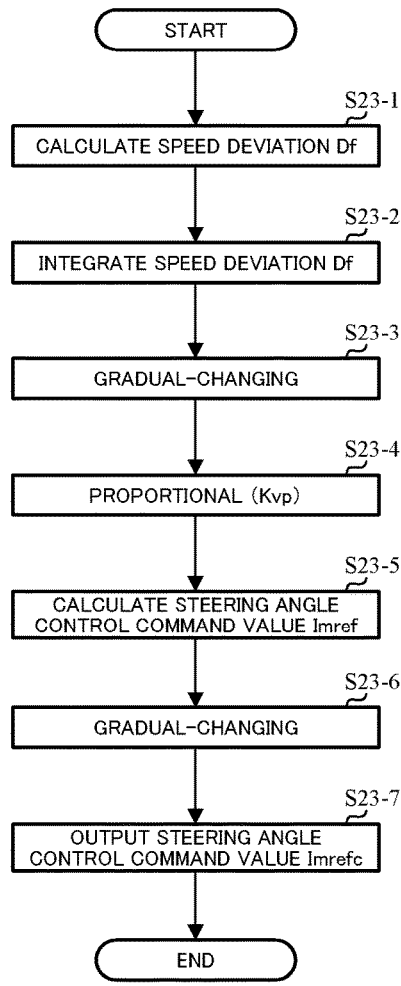
FIG. 15 is a flowchart showing an operation example (the fourth example) of the steering angle control section.

In such a configuration, an operation example will be described with reference to a flowchart of FIG. 15. In this case, the operation of the steering angle control section 200 is only different from that of the speed control section 220 in FIG. 6, and is the same as the flowchart of FIG. 7 except for Steps S20-1 to S20-3 corresponding to the speed control.

At first, the speed deviation Df is calculated at the subtracting section 221 (Step S23-1), the speed deviation Df is inputted into the integral section and is integrated, and the steering angle control command value Ir1, which is an integral value, is inputted into the subtracting section (Step S23-2). The actual steering angle speed ωr is inputted into the multiplying section 224, and is gradual-changed with the steering angle control gradual-changing gain SG at the multiplying section 224. The gradual-changed steering angle speed ωr2 is inputted into the proportional section 225 and is proportional-processed (Kvp), and the steering angle control command value Ir2 from the proportional section 225 is inputted into the subtracting section 223 (Step S23-4). The subtracting section 223 subtracts the steering angle control command value Ir2 from the steering angle control command value Ir1, and calculates and outputs the steering angle control command value Imref (Step S23-5). Then, the steering angle control command value Imref is gradual-changed with the steering angle control gradual-changing gain SG at the multiplying section 203 (Step S23-6), and the gradual-changed steering angle control command value Imrefc is outputted (Step S23-7).

As described above, the steering angle control gradual-changing gain is the same as the gradual-changing gain which is used to the steering angle speed command value. However, independent gradual-changing gains may be used, and the gradual-changing time and the gradual-changing timing of the steering angle control gradual-changing gain and the assist control gradual-changing gain may be arbitrarily varied. The present gradual-changing section comprises the input of the gain and the multiplying section. A means that the output is gradually varied may be used.

As described above, the speed control is treated as an object. A control method that the input such as a required steering angle is stored and this value is utilized to the output such as the current command value is also effective. If the above function is incorporated in the position control and the speed control, other configuration can appropriately be varied.

Further, the actual steering angle speed may be obtained from the motor speed and the reduction ratio, and may be obtained from the handle steering angle sensor.

EXPLANATION OF REFERENCE NUMERALS 1 handle (steering wheel)
2 column shaft (steering shaft, handle shaft)
10, 154 torque sensor
12 vehicle speed sensor
13 battery
14 steering angle sensor
20, 150 motor
30 control unit (ECU)
31 current command value calculating section
33 current limiting section
37 inverter
130 vehicle-side ECU
37 EPS-side ECU
141 assist control section
142 switching section
200 steering angle control section
201, 203, 204 multiplying section
202 limiter
210 position control section
220 speed control section

The invention claimed is:
1. An electric power steering apparatus that has a function to switch an assist control mode and a steering angle control mode, generates a motor current command value by means of a first assist control command value calculated at an assist control section and a first steering angle control command value calculated at a steering angle control section, and assist-controls a steering system of a vehicle by driving a motor by means of said motor current command value,
wherein said steering angle control section comprises:
a position control section that inputs a target steering angle and an actual steering angle and outputs a first steering angle speed command value;
a gradual-changing limiting section that limits an upper limiting value and a lower limiting value by gradual-changing said first steering angle speed command value corresponding to a steering angle control gradual-changing gain;

a speed control section that processes a second steering angle speed command value, which is outputted from said gradual-changing limiting section, based on an actual steering angle speed and a steering angle control gradual-changing gain; and a first gradual-changing section that gradual-changes said first steering angle control command value, which is outputted from said speed control section, corresponding to said steering angle control gradual-changing gain and outputs a second steering angle control command value, wherein said electric power steering apparatus further comprises a second gradual-changing section that gradual-changes said first assist control command value, which is outputted from said assist control section, with an assist control gradual-changing gain and outputs a second assist control command value, wherein said motor current command value is generated based on said second steering angle control command value and said second assist control command value.

2. The electric power steering apparatus according to claim 1, wherein a sum of a rate of said steering angle control gradual-changing gain and a rate of said assist control gradual-changing gain is 1.0 or 100% when said assist control mode and said steering angle control mode are switched, and said rate of said steering angle control gradual-changing gain inversely increases or decreases when said rate of said assist control gradual-changing gain decreases or increases.

3. The electric power steering apparatus according to claim 2, wherein said gradual-changing limiting section comprises a third gradual-changing section that gradual-changes said first steering angle speed command value corresponding to said steering angle control gradual-changing gain; and a limiter that limits an upper limiting value and a lower limiting value of a steering angle speed command value after gradual-changing which is gradual-changed at said third gradual-changing section, and outputs a second steering angle speed command value.

4. The electric power steering apparatus according to claim 3, wherein said upper limiting value and said lower limiting value of said limiter are variably set corresponding to said steering angle control gradual-changing gain.

5. The electric power steering apparatus according to claim 2, wherein said position control section comprises a first subtracting section that calculates a position deviation between said target steering angle and said actual steering angle; and a gain section that outputs said steering angle speed command value by gain-multiplying said position deviation.

6. The electric power steering apparatus according to claim 2, wherein said speed control section comprises:
a second subtracting section that subtracts said actual steering angle speed from said second steering angle speed command value;
an integral section that integral-processes a subtracting result of said second subtracting section;
a proportional section that proportional-processes said actual steering angle speed;
a third subtracting section that subtracts a proportional result of said proportional section from an integral result of said integral section; and
a fourth gradual-changing section that gradual-changes a subtracting result of said third subtracting section with said steering angle control gradual-changing gain and outputs said first steering angle control command value.

7. The electric power steering apparatus according to claim 2, wherein said speed control section comprises:
a second subtracting section that subtracts said actual steering angle speed from said second steering angle control command value;
a multiplying section that gradual-changes a speed deviation from said second subtracting section with said steering angle control gradual-changing gain and outputs a speed deviation;
an integral section that integral-processes said speed deviation;
a proportional section that proportional-processes said actual steering angle speed; and
a subtracting section that subtracts a proportional result of said proportional section from an integral result of said integral section and outputs said first steering angle control command value.

8. The electric power steering apparatus according to claim 2, wherein said speed control section comprises:
a second subtracting section that subtracts said actual steering angle speed from said second steering angle speed command value;
an integral section that integral-processes a speed deviation from said second subtracting section;
a proportional section that proportional-processes said actual steering angle speed;
a fourth gradual-changing section that gradual-changes an integral result of said integral section with said steering angle control gradual-changing gain and outputs a third steering angle control command value; and
a third subtracting section that subtracts a proportional result of said proportional section from said third steering angle control command value and outputs said first steering angle control command value.

9. The electric power steering apparatus according to claim 2, wherein said speed control section comprises:
a second subtracting section that subtracts said actual steering angle speed from said second steering angle speed command value;
an integral section that integral-processes a speed deviation from said second subtracting section;
a fourth gradual-changing section that gradual-changes said actual steering angle speed with said steering angle control gradual-changing gain and outputs a steering angle control command value after gradual-changing;
a proportional section that proportional-processes said steering angle control command value after gradual-changing; and
a third subtracting section that subtracts a proportional result of said proportional section from an integral result of said integral section and outputs said first steering angle control command value.

10. The electric power steering apparatus according to claim 1, wherein said gradual-changing limiting section comprises a third gradual-changing section that gradual-changes said first steering angle speed command value corresponding to said steering angle control gradual-changing gain; and a limiter that limits an upper limiting value and a lower limiting value of a steering angle speed command value after gradual-changing which is gradual-changed at said third gradual-changing section, and outputs a second steering angle speed command value.

11. The electric power steering apparatus according to claim 10, wherein said upper limiting value and said lower limiting value of said limiter are variably set corresponding to said steering angle control gradual-changing gain.

12. The electric power steering apparatus according to claim 11, wherein said position control section comprises a first subtracting section that calculates a position deviation between said target steering angle and said actual steering angle; and a gain section that outputs said steering angle speed command value by gain-multiplying said position deviation.

13. The electric power steering apparatus according to claim 10, wherein said position control section comprises a first subtracting section that calculates a position deviation between said target steering angle and said actual steering angle; and a gain section that outputs said steering angle speed command value by gain-multiplying said position deviation.

14. The electric power steering apparatus according to claim 1, wherein said position control section comprises a first subtracting section that calculates a position deviation between said target steering angle and said actual steering angle; and a gain section that outputs said steering angle speed command value by gain-multiplying said position deviation.

15. The electric power steering apparatus according to claim 1, wherein said speed control section comprises:
   a second subtracting section that subtracts said actual steering angle speed from said second steering angle speed command value;
   an integral section that integral-processes a subtracting result of said second subtracting section;
   a proportional section that proportional-processes said actual steering angle speed;
   a third subtracting section that subtracts a proportional result of said proportional section from an integral result of said integral section; and
   a fourth gradual-changing section that gradual-changes a subtracting result of said third subtracting section with said steering angle control gradual-changing gain and outputs said first steering angle control command value.

16. The electric power steering apparatus according to claim 1, wherein said speed control section comprises:
   a second subtracting section that subtracts said actual steering angle speed from said second steering angle control command value;
   a multiplying section that gradual-changes a speed deviation from said second subtracting section with said steering angle control gradual-changing gain and outputs a speed deviation;
   an integral section that integral-processes said speed deviation;
   a proportional section that proportional-processes said actual steering angle speed; and
   a subtracting section that subtracts a proportional result of said proportional section from an integral result of said integral section and outputs said first steering angle control command value.

17. The electric power steering apparatus according to claim 1, wherein said speed control section comprises:
   a second subtracting section that subtracts said actual steering angle speed from said second steering angle speed command value;
   an integral section that integral-processes a speed deviation from said second subtracting section;
   a proportional section that proportional-processes said actual steering angle speed;
   a fourth gradual-changing section that gradual-changes an integral result of said integral section with said steering angle control gradual-changing gain and outputs a third steering angle control command value; and
   a third subtracting section that subtracts a proportional result of said proportional section from said third steering angle control command value and outputs said first steering angle control command value.

18. The electric power steering apparatus according to claim 1, wherein said speed control section comprises:
   a second subtracting section that subtracts said actual steering angle speed from said second steering angle speed command value;
   an integral section that integral-processes a speed deviation from said second subtracting section;
   a fourth gradual-changing section that gradual-changes said actual steering angle speed with said steering angle control gradual-changing gain and outputs a steering angle control command value after gradual-changing;
   a proportional section that proportional-processes said steering angle control command value after gradual-changing; and
   a third subtracting section that subtracts a proportional result of said proportional section from an integral result of said integral section and outputs said first steering angle control command value.

* * * * *